Figure 1:
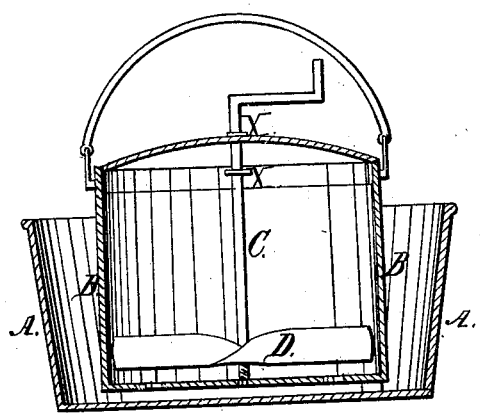
Figure 2:

D. K. Hickok,
Potato Washer,
N° 82,950. Patented Oct. 13, 1868.

Witnesses:

Inventor:

D. K. HICKOK, OF MORRISVILLE, VERMONT.

Letters Patent No. 82,950, dated October 13, 1868; antedated September 30, 1868.

IMPROVED POTATO-WASHER.

The Schedule referred to in these Letters Patent and making part of the same.

*To all whom it may concern:*

Be it known that I, D. K. HICKOK, of Morrisville, in the county of Lamoille, and in the State of Vermont, have invented certain new and useful Improvements in Potato-Washers; and do hereby declare that the following is a full, clear, and exact description thereof, reference being had to the accompanying drawings, and the letters of reference marked thereon.

In the annexed drawings, making a part of this specification, A represents a tub or vessel, of any suitable form and size, and B represents another smaller vessel, made so as to fit inside of the vessel A.

The vessel B is provided with short legs or feet, so as not to fit close to the bottom of the vessel A. It is also provided with a suitable lid, which forms a bearing for the crank-shaft C.

The vessel B is provided with a series of holes or perforations through the bottom of it, so as to allow free passage of water out or in, as the case may be.

C represents a vertical shaft, having its bearing in the centre of the lid of the vessel B, and bent so as to form a crank at the upper end thereof. The said shaft is provided with collars or shoulders $x\ x$, above and below the lid of the vessel B, so as to be securely held in its place, and yet allowed to work up and down between said collars $x\ x$.

D represents an arm, secured to the bottom of the shaft C, made just long enough to fit and work in the vessel B, and curved in the form shown in the drawing. The arm D, when made in the shape shown, so as to be angling in front of the ends thereof, will overcome all centrifugal force and motion that would otherwise be given to the potatoes in the vessel when agitated by means of an ordinary arm.

To use this device, I first fill or partially fill the vessel B with potatoes, and set the same inside of the vessel A, and then pour a suitable quantity of water over the potatoes and into said vessels, after which the lid is adjusted, and the crank and shaft C turned a few times, and the potatoes are thoroughly and completely washed.

Having thus fully described my invention,

What I claim as new, and desire to secure by Letters Patent, is—

The arrangement of the arm D and shaft C with the vessel B, when provided with a lid and feet and perforations, as described, the several parts being constructed and used as and for the purpose herein set forth.

In testimony that I claim the foregoing, I have hereunto set my hand, this 24th day of March, 1868.

D. K. HICKOK.

Witnesses:
C. M. ALEXANDER,
V. D. STOCKBRIDGE.